Oct. 6, 1964 R. STRUMPF Re. 25,650

FISHING CLIP

Original Filed May 17, 1961

INVENTOR.
Richard Strumpf.

BY

ATTORNEY.

United States Patent Office

Re. 25,650
Reissued Oct. 6, 1964

25,650
FISHING CLIP

Richard Strumpf, P.O. Box 943, Marathon, Fla.

Original No. 3,077,048, dated Feb. 12, 1963, Ser. No. 110,802, May 17, 1961. Application for reissue Feb. 19, 1964, Ser. No. 358,391
5 Claims. (Cl. 43—43.12)

Matter enclosed in heavy brackets [ ] appears in the original patent but forms no part of this reissue specification; matter printed in italics indicates the additions made by reissue.

This invention relates to a device which is used in fishing, and more particularly, this device relates to a clip which is used on outriggers of fishing ships.

There are certain types of fish, such as sailfish which, upon seeing a prey in the water, attack with a flash stunning the prey and then circling around and moving in for the kill once they are sure that the prey has been stunned. It has been found that, when a fish of the type set forth above strikes, and the bait which it has hit does not discontinue motion and lie idle, the fish will reject the bait. In order to cause the bait to lie idle in the water after it has been hit, the fishing line is passed from the end of a fishing pole at the stern of a ship to the clip on an outrigger and thence to the water instead of being towed directly behind a boat. The clip is provided with means responsive to a tug at the line which will snap open a hoop thereon releasing the slack in the line with the result that the bait which is being dragged behind the boat will momentarily lie motionless in the water as the slack is slowly taken up by the boat's forward motion. During the interval of time during which the slack is being taken up, the fish will circle the bait and strike in the belief that it has stunned the prey.

This invention relates to a clip having a book provided thereon and means to adjust the tension on the hook whereby when a pulling force is exerted on the hook of a certain pre-set magnitude, the hook will spring open releasing any line which is passed therethrough.

It is accordingly an object of this invention to provide a clip which is provided with a hook for passing a line therethrough which is responsive to pulling forces whereby it will snap open.

It is a further object of this invention to provide a control means whereby the hook may be made responsive to a range of pulling forces of different magnitudes whereby it may be set to respond to a force having a predetermined magnitude.

It is still another object of this invention to provide a device of the type described which is without springs or parts which jam, but which has a fine, sensitive adjustment whereby a fisherman may troll a minnow or a very heavy bait.

It is also another object of this invention to provide a clip made of a lightweight material of which the parts are of rustproof material.

It is a broad object of this invention to provide a device of the type hereinafter described, which is strong and durable, or simple and practical construction, relatively inexpensive to manufacture, and otherwise well adapted for the purposes for which the clip is intended.

In accordance with these and other objects which will become apparent hereinafter, the instant invention will now be described with reference to the accompanying drawings illustrating a preferred embodiment thereof.

Figure 1:
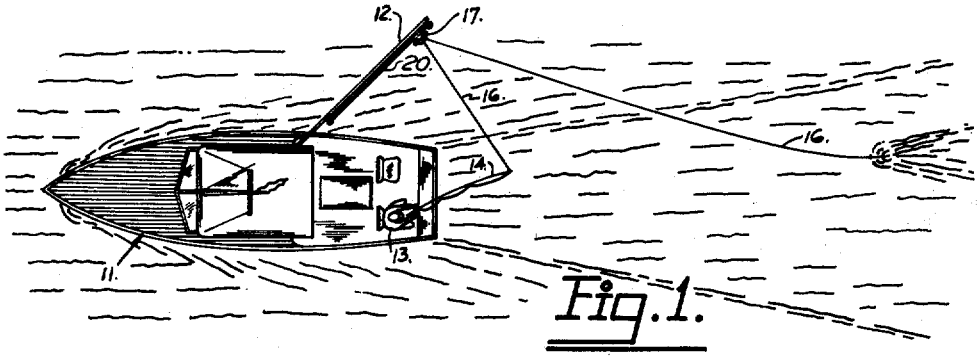
FIG. 1 is a perspective view of a boat on which the clip is used.
Figure 2:
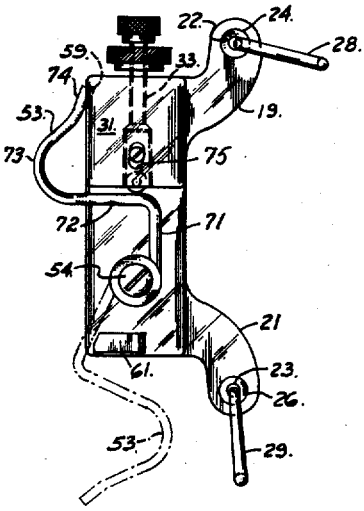
FIG. 2 is a side elevation view of the clip.
Figure 3:
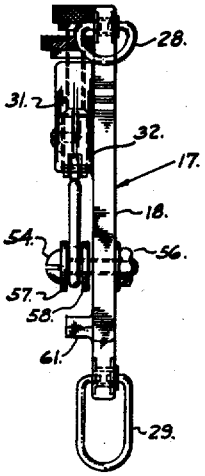
FIG. 3 is a front elevation view of the clip.
Figure 6:
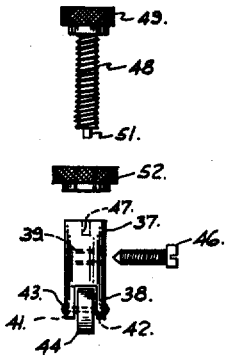
FIG. 6 is an exploded view of the working parts shown in FIG. 5.

Referring more particularly to the drawings, wherein like reference characters designate like or corresponding parts throughout the different views, and referring particularly to FIG. 1, 11 designates generally a boat having an outrigger 12 mounted thereon and showing a man 13 fishing from the stern thereof. The man 13 is using a rod 14 having a line 16 dragging in the water, the line 16 not falling directly into the water but passing through a clip 17 on the outrigger 12 and then to the water. The clip 17, which is shown in FIGS. 2 and 3, is affixed to a line 20 on a pulley system mounted on the outrigger whereby the clip may be drawn into the ship or passed out over the water to any position on the outrigger 12. Referring to the clip, it comprises a [plate 18] *body which in the illustrative embodiment takes the form of a plate 18 having a flat surface* which may be made of plastic, metal or other suitable material having two extending portions called ears, designated 19 and 21, in which there are provided respectively holes 22 and 23 having received therein rivets 24 and 26. [Within the rivets, metal loops 28 and 29 are provided and the line 20 passed through them. On the clip there is rigidly affixed a protrusion 31.] *Metal loops 28 and 29 are supported in the holes and the line 20 passes through them. On the clip there is rigidly affixed a boss-like protrusion 31 fixed to the surface* along a mating line 32 of glue or other material, if the protrusion is not integral with the plate. The protrusion portion 31 is provided with a threaded bore 33 therein and a chamber 34, there being a shoulder 36 between said chamber and said bore. A transverse adjustment slot 75 is provided communicating between the exterior surface of the protrusion and the chamber for a purpose to be specified more fully hereinafter. A cylindrical insert 37, see FIG. 6, receivable in said chamber is provided, said insert having a forked end 38. In the top of the insert a recess 47 is provided; through the central portion of the insert a threaded hole 39 is provided; and, in the prongs of the forked end, aligned holes 41 and 42 are provided. A pin 43 is passed through the holes 41 and 42 holding in position between the prongs of said forked end a roller 44, which is mounted to said pin. A small threaded screw 46 is passed through the adjustment slot 75 and is received in said lateral threaded hole 39. A threaded screw 48 having a head end 49 and a center extension 51 is received in said threaded bore 33 and provided with a knurled lock nut 52 whereby when the screw is turned forces can be directed to the insert causing it to move downwardly in the chamber. A hook 53 is mounted to the clip on a screw 54 between washers 57 and 58, said screw being fixedly mounted to the clip by means of a nut 56 and being aligned with the axis of the bore 33 and the chamber 34. On the side of the clip a groove 59 is provided for receiving the hook end and holding it flush to the side of the plate. In use, the hook 53, which has a stem 71, a straight portion 72, and a curved portion 73 provided with a flared tip 74, may be positioned as shown in FIG. 2 and the screw 49 screwed down so that the roller 44 mounted to the insert 37 engages the hook causing there to be a force exerted on the hook which tends to resist any forces which would pull the end of the hook from the groove 59 to the dotted position shown in FIG. 2. Upon application of further adjustment of the screw 49 the force which is required to pull the end of the hook 53 from the groove 59 may be either increased or decreased. A fisherman may select the proper setting of the screw 49 and lock it into position by means of the lock nut 52.

It is apparent from FIG. 2 that when the clip is in the set position, the straight portion 72 of the hook 53 is disposed beneath the chamber 34 on a line which is parallel to one of its diameters and normal to its axis, while the stem portion 71 is disposed parallel to its major vertical axis and displaced therefrom in a direction toward the side away from the hooked portion 53, whereby an application of force leftwardly on the hooked portion 53 causes said straight portion 72 and stem portion 71 to act as a spring retaining the flared tip 74 in the groove 59 until sufficient force is exerted on the hooked portion 53 of said hook to overcome the downwardly directed force of the roller 44 by bending the portions 72 and 71.

Assuming a proper adjustment has been made, the clip is used by passing a fishing line through the hook 53 of a clip which has been hooked on to the pulley system 20 by passing line 20 through the loops 28 and 29. In normal use, the clip is out on the outrigger at the position shown in FIG. 1. If the clip is in this position and a fish hits the bait on the line 16, it will cause the hook 53 to open if it has been set by the screw 49 to respond to the pressure which is customarily exerted by a fish of the type which strikes. This will cause there to be released a slack in the line as that portion between the rod 14 and the clip 17 is released, which will cause the bait to become idle. A fish of the type here concerned will circle the bait and, believing it to have been stunned by its initial hit, will strike for keeps and be caught.

It will be seen that, should the hook and line become fouled with seaweed, by means of the pulley 20 the clip 17 can be pulled into the boat and unfouled and then by means of the pulley again traveled to the outward extension of the outrigger.

Figure 4:
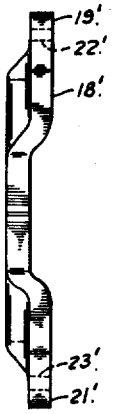
FIG. 4 is a front elevation of an alternative for the plate 18 shown in FIG. 3.
Figure 5:
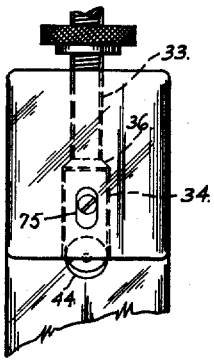
FIG. 5 is a partial view of FIG. 2.

A stop 61 may be provided on the clip to limit the downward movement of the hook 53 and numerous other modifications will be apparent such as that shown in FIG. 4 in which the ears 19 and 21 are offset from the main body of the plate 18 whereby when the protrusion 31 is affixed to the plate, the ears will be on the center line of the clip.

It is found that a device of non-rustable materials is to be desired to avoid the corrosive effects of salt water and the elements.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination a clip comprising; a plate having a top surface and a bottom surface, an upwardly extending ear portion and a downwardly extending ear portion on one side of said plate and the other side of the plate having a groove disposed near the top surface and a stop abutment provided near the bottom surface, there being a hole in each of said ears, a rivet received in each of said ears and a metal hanging loop in each of said rivets; a protrusion having a top surface and a bottom surface affixed to said plate and disposed with the top surface thereof being co-planar with the top surface of said plate, said protrusion having a chamber extending upwardly from the bottom surface thereof, there being a threaded bore extending downwardly from the top surface thereof communicating with said chamber, and there being a transverse adjustment slot communicating between the exterior surface of said protrusion and said chamber; a hook having a stem portion, a straight portion at right angles to said stem portion, and a curved portion provided with a flared tip, said hook being rotatably mounted to said clip at the end of the stem at a point disposed in alignment with the center line of said bore and said chamber, said hook being normally disposed with said flared tip received in said groove, said straight portion disposed beneath said chamber on a line parallel to a diameter of said chamber, said stem portion being disposed parallel to an extension of the center line of said bore and chamber and displaced therefrom in the direction toward said one side; and means disposed in said bore and chamber whereby pressure may be exerted on the straight portion of said hook thereby retaining said tip in said groove until sufficient forces are exerted on the curved portion of said hook to overcome the forces exerted by said means.

2. A clip as set forth in claim 1 wherein said means comprise a cylindrically-shaped insert having a forked end, a head end having a recess therein, and a laterally disposed diametrical threaded bore therethrough, said insert being received in said chamber with said head end disposed adjacent to said bore, a roller disposed in said forked end and a pin rotatably mounting said roller in said forked end, a lock nut disposed on said top surface of said plate and said protrusion, a threaded bolt having a cylindrical extension threadably received in said nut and said bore, said cylindrical extension being received in said recess and a screw disposed in said adjustment slot and said lateral diametrical bore of said insert whereby said insert is locked within said chamber.

3. A fishing line clip adjustable to be released from its set position by a pull on the line of a predetermined magnitude, comprising a plate having a protrusion on one side thereof and said protrusion having a threaded bore therethrough parallel to one face of the plate and thereadjacent; a hook member connected with the plate at a pivot located in line with the axis of the bore and spaced therefrom, and said hook member including a straight portion disposed across the end of said bore adjacent the pivot and normal to said axis when the hook member is in set position and including on one end of the straight portion a line-receivink hook and on the other end a stem portion joining said pivot; and restraining means engaging the threads in said bore and axially adjustable with respect thereto and abutting said straight portion to maintain the hook member in set position until released by a pull on the hook sufficient to distort the straight portion and the stem portion past the restraining means.

*4. A fishing line clip adjustable to be released from its set position by a pull on the line of a predetermined magnitude, comprising a body having a surface and having a protrusion stepped from said surface and adjacent thereto, and said protrusion having a threaded bore therein disposed parallel to said surface and thereadjacent; a hook member overlying said surface and connected with the body by a pivot disposed normal to said surface and located opposite the bore and spaced therefrom, and said hook member including a straight portion disposed across the end of said bore nearest the pivot and normal to the bore and extending therebeyond in both directions when the hook member is in set position and including on one end of the straight portions a line-receiving hook and on the other end a stem portion joining the straight portion and said pivot; restraining means engaging the threads in said bore and axially adjustable with respect thereto and abutting said straight portion when the hook member is in set position to maintain the latter in set position until released by a pull on the hook sufficient to distort the straight portion and the stem portion and pivot them past the restraining means; and loop means attached to the body for supporting the clip.*

*5. A fishing line clip adjustable to be released from its set position by a pull on the line of a predetermined magnitude, comprising a body having a surface and having a boss stepped out from said surface and adjacent thereto, and said boss having a bore therethrough disposed parallel to said surface; a hook member lying usbstantially parallel with said surface and attached thereto by a pivot disposed normal to the surface, and said hook*

*member including a straight portion disposed at right angles to and entirely across the end of said bore nearest the pivot when the hook member is in set position and said member including on one end of the straight portion a line-receiving hook and on the other end a stem portion joining the straight portion with said pivot; and restraining means in said bore and axially positioned with respect thereto and abutting said straight portion when the hook member is in set position to maintain the latter in set position until released by a pull on the hook sufficient to distort the straight portion and the stem portion and pivot them past the restraining means.*

References Cited by the Examiner

The following references, cited by the Examiner, are c record in the patented file of this patent or the ori inal patent.

UNITED STATES PATENTS

| | | | |
|---|---|---|---|
| 1,700,767 | 2/29 | Kliem et al. | 280—45 |
| 2,730,832 | 1/56 | Mathers. | |
| 2,733,537 | 2/56 | Elsberg | 43—43.1 |
| 2,864,199 | 12/58 | Vollten. | |
| 2,958,973 | 11/60 | Le May | 43—43.1 |

SAMUEL KOREN, *Primary Examiner.*